INVENTORS.
ANDREW B. STEEVER
RICHARD E. SVENCER
BY Theodore M. Jablon
ATTORNEY.

INVENTORS: ANDREW B. STEEVER
RICHARD E. SVENCER
BY: Theodore M. Jablon
ATTORNEY.

United States Patent Office 3,552,033
Patented Jan. 5, 1971

3,552,033
DIFFUSION NOZZLE FOR SOLIDS FLUIDIZING
APPARATUS
Andrew B. Steever, Old Greenwich, and Richard E.
Svencer, Norwalk, Conn., assignors to Dorr-Oliver
Incorporated, Stamford, Conn., a corporation of Delaware
Filed Sept. 3, 1968, Ser. No. 756,927
Int. Cl. F26b 17/10
U.S. Cl. 34—57                                11 Claims

ABSTRACT OF THE DISCLOSURE

Improved nonsifting high capacity nozzle for diffusion of a fluidizing gas upwardly through the constriction plate of a solids fluidizing apparatus, featuring a nozzle head having a radially directed gas passages in multilevel arrangement, with internal graduated flow constricting means so constructed and arranged that pressure differentials between the passage of the upper level and the passage of the lower level are compensated for.

---

This invention relates to solids fluidizing apparatus wherein a bed of solids is maintained under solids fluidizing conditions by means of a fluidizing gas forced upwardly through a diffuser plate or constriction plate.

More particularly, this invention relates to improvements in the gas diffuser nozzle or tuyeres inserted in the holes of the constriction plate, and designed to prevent back sifting of the solids into the windbox below the constriction plate in case of shutdown of the unit. These nozzles or tuyeres comprise a neck portion in the constriction plate, and a head portion rising from the planar top face of the constriction plate, having radially directed gas passages arranged to provide adequate diffusion or distribution in the bed as well as normally to prevent the back sifting of solids in the manner exemplified in the U.S. Pat. to Dalton No. 2,841,476 and to Frost No. 3,040,439.

The present invention is herein illustrated in a fluidized bed drier of the type wherein a closed cylindrical vessel is provided with a horizontal apertured partition or plate dividing the vessel into an upper drying chamber and a lower chamber or windbox for supplying the fluidizing gas. The upper chamber contains the bed of solids maintained by the fluidizing gas such as hot air or hot combustion gases passing upwardly through the plate and through the bed at fluidizing velocities, whereby the solids of the bed are rendered into turbulent mobility so that the bed resembles a body of boiling liquid. The apertured plate with the inserts or tuyeres serves to distribute and diffuse the gas so as to maintain the bed in a uniformly fluidized condition.

The hot fluidizing gas under proper operating conditions surrounds each particle of the solids intimately, thus providing heat under optimum conditions. The stream of fluidizing gas can also be utilized to cause a size separation of the solids whereby the fine material is carried off with the spent fluidizing gas. Subsequent separations and recovery of the fines from the air stream can be effected in a cyclone or the like, while the larger or coarser material is retained in the fluidized bed for removal therefrom as desired.

Comminuted ore, coal, potash and phosphate rock are examples of materials that may thus be subjected to a drying operation or a combined drying, and size separation operation. Depending upon the density or weight of the material itself and the particle sizes, the depth of the fluidized bed exerts a corresponding hydrostatic pressure like a liquid which must be overcome by the windbox pressure of the gas.

For practical reasons, the inserts or gas diffusion nozzles must be adequately spaced from one another. Also where the constriction plate is composed of refractory blocks fitted together to constitute a self-sustaining arched or domed construction, the number of gas nozzles or tuyeres is determined and limited by the number of refractory blocks inasmuch as normally only one nozzle can be accommodated in one block.

The invention is concerned with the problem of providing adequate gas passage area in the tuyere heads, to satisfy process conditions requiring an especially large volume of fluidizing gas at high fluidizing gas flow rates to be accommodated in a limited number of said tuyeres in a treatment chamber of given upflow area.

The above stated problem of providing nozzle heads having sufficient effective gas passage area is further aggravated by the necessity of maintaining the gas pressure loss across the constriction plate low enough (preferably in the order of 10 inches $H_2O$) so as to preclude having excess windbox gas pressures dislodge the inserts or even the refractory blocks in an arched constriction plate.

Heretofore in order to meet high gas flow rates for instance in the drying and sizing of phosphate rock the problem of making sufficient gas passage area available, was met by employing a tuyere having a vertically elongated simple cylindrical head portion closed at the top, but having a plurality up to five, of vertically superposed gas passage zones each of which in turn comprises a plurality of radially directed gas passages or holes delivering gas streams at respective different levels radially in all directions. The wall of the head portion is of substantial thickness in order to accommodate radial gas passages of a length sufficient to prevent back sifting of particles during shutdown of the unit.

Whereas these longitudinally extended thick-walled non-sifting tuyere heads have provided adequate gas passage area and gas distribution at the fluidizing gas flow rates called for by the particular phosphate rock treatment operation, they were found to be subject to rapid erosion and deterioration when employed for the process of drying and size separation of ore particles of high density or specific gravity, requiring a greater gas volume to maintain the fluidized condition of the bed at substantially higher gas upflow rates in the bed.

Under such intensified conditions, severe erosion would occur not only in and around the gas passages of the tuyere head, but also of the cylindrical wall. Severe erosion from within was also noted in the top closed end of the head. Such erosion or deterioration of the tuyere head upsets the desired uniformity of gas distribution or diffusion, impairing the quality of treatment, while causing expensive shutdowns for replacement of expensive stainless steel tuyeres.

The invention provides a tuyere head embodying multilevel vertically superposed gas passage zones, so constructed and arranged that the aforementioned erosion is avoidable even under the above stated intensified operating conditions and flow velocities.

According to the invention, the improved tuyere head compensates for certain destructive conditions occurring in the above outlined multilevel tuyere head of earlier construction when subjected to the above stated different and intensified process conditions involving a material of high abrasiveness.

Under such intensified conditions and with a comminuted ore body containing high density particles of relatively high abrasiveness, it appeared that during operation there were set up unfavorable pressure imbalances inside as well as outside the tuyere head, as between the gas passages in the upper zone or level and the gas passages in the lower zone or level. Thus, even though the gas passages were nonsifting during shutdown, during operation ore particles would by some manner of reverse flow or aspirator effect penetrate into the interior of the tuyere head, presumably through the lower level gas passages, and while being swirled wildly their abrasive nature would cause erosion and deterioration of the nozzle head from within.

The internal pressure imbalance appears to be due to the high velocity at which the gases enter the neck or shank portion of the tuyere, so that a high impact pressure zone is created at the closed top end of the head portion (pressure regain), while lower pressure prevails in the bottom zone of the interior of the head. Such pressure differential favors intensified flow of gas through the upper zone while relatively starving the lower zone. Also, the incoming gas moving at high "shank velocity" past the gas passages in the lower zone may produce some minor aspirator effect or erosive swirls in or around the lower gas passages, causing some particles to be drawn into the interior of the tuyere head, where they then produce the aforementioned erosion or destruction.

This condition caused by the above explained internal pressure imbalance is aggravated by an external pressure imbalance due to the differential in hydrostatic pressure of the fluidized bed, between the levels of top-and-bottom gas passage zones. Accordingly, the back pressure or resistance against the flow of gas at the bottom level is greater than flow resistance at the upper level, which unfavorable hydrostatic pressure differential increases with the number of vertically stacked gas passage zones, as well as with an increase in the density or specific gravity of the fluidized bed which in turn depends upon the density or specific gravity of the material.

The object therefore is to provide an improved multilevel tuyere head so constructed that entry of ore particles or the like into the interior is suppressed.

To that end, the invention provides a tuyere or gas diffusion nozzle in the form of a tubular member open at the bottom and closed at the top, comprising a neck or shank portion fitted into a hole of the constriction plate, and a head portion extending upwardly from the horizontal top face of the plate. The head portion has outwardly or radially directed passages for the fluidizing gas in multilevel arrangement, that is arranged in a plurality of vertically superposed zones. Means are provided within the head portion for upwardly decreasing the effective flow cross-section of the interior of the head portion, in such a manner as to compensate for the contrary effects of the aforementioned internal and external pressure imbalances, thereby substantially equalizing the flow of fluidizing gas through the passages in the respective zones, thus avoiding the aforementioned erosion or deterioration.

In one embodiment of the invention, the compensating flow-constricting means comprise graduated projections functionally associated with the gas passages of the respective zones in such a manner as to positively divert substantially equal gas velocities into the respective vertically superposed zones. The projections may be such as to provide horizontal inverted annular shoulders extending inwardly and overhanging the passage openings in the respective zones, or a flow-constricting member is inserted through the top of the nozzle to provide graduated flow constriction.

Other features and advantages of the invention will hereinafter appear.

Figure 4:
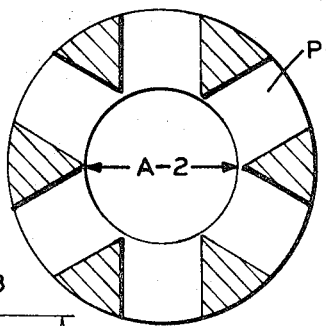
Figure 3:
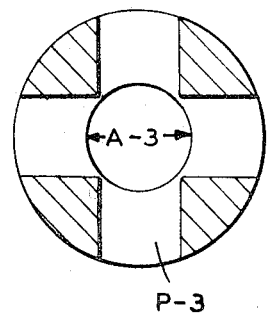
Figure 5:
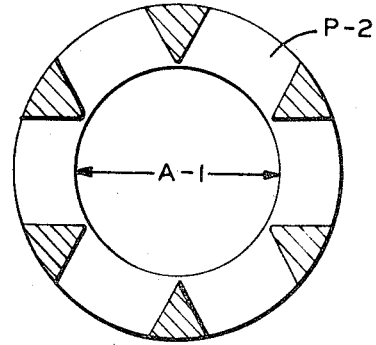

FIGS. 3, 4, and 5 are cross-sectional views taken at several elevations of the nozzle head, on lines 3—3, 4—4, and 5—5 respectively.

Figure 6:
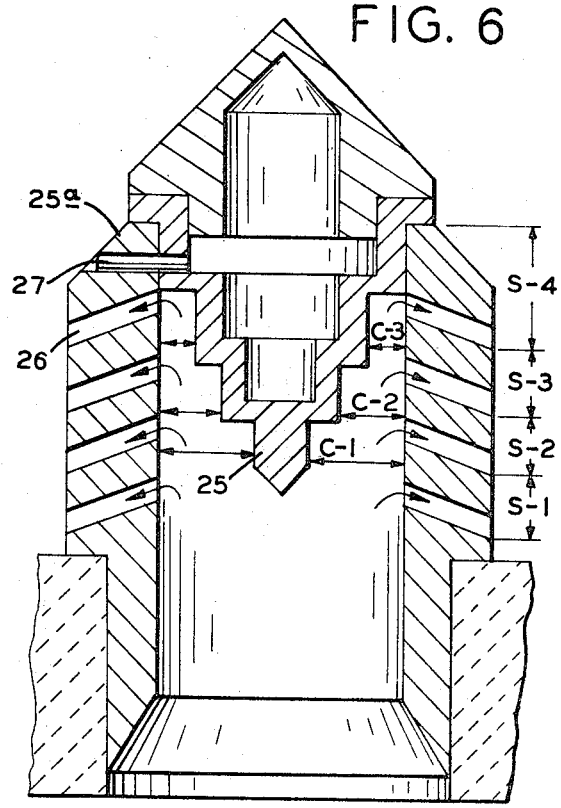

FIG. 6 is a vertical sectional view of another form of the improved nozzle head featuring a graduated gas flow constriction formed by a centrally inserted graduated constriction member.

Figure 7:
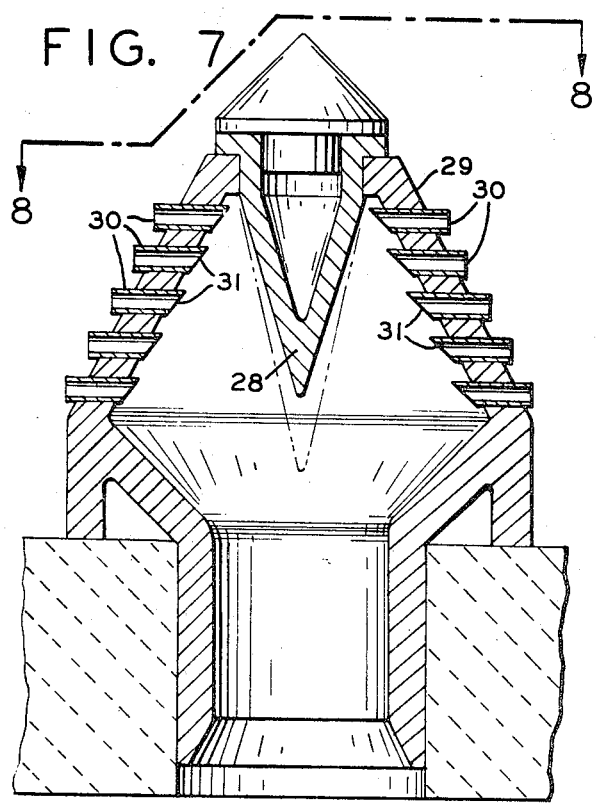

FIG. 7 shows another form of the nozzle head, providing a combination of a flow constricting central insert member with other flow-constricting means embodied in the body of the nozzle head.

Figure 8:
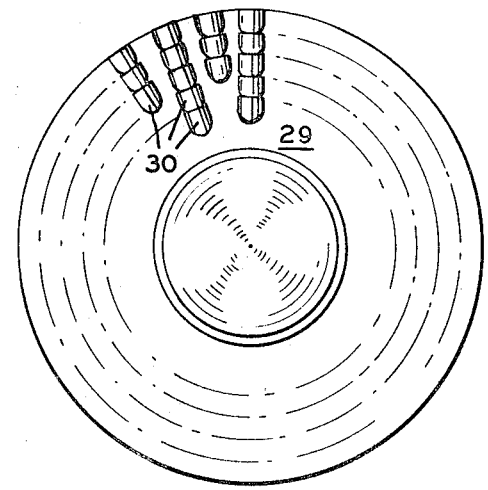

FIG. 8 is a top view taken on line 8—8 in FIG. 7.

Figure 9:
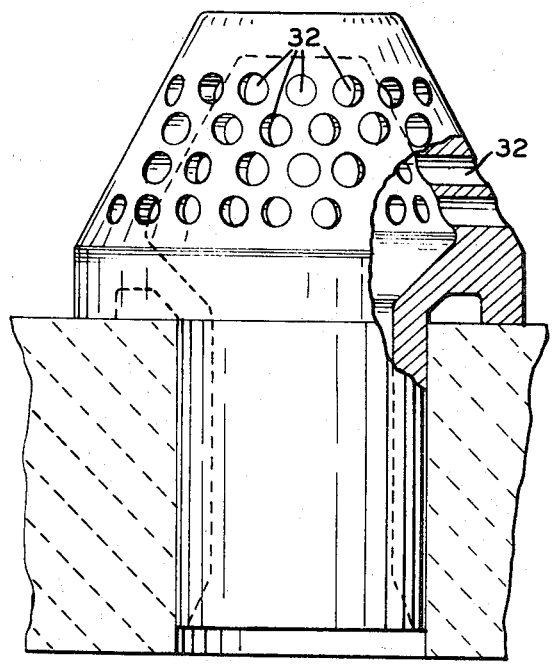

FIG. 9 is still another form of the invention wherein the flow constricting means are provided in the shape of the nozzle head.

Figure 10:
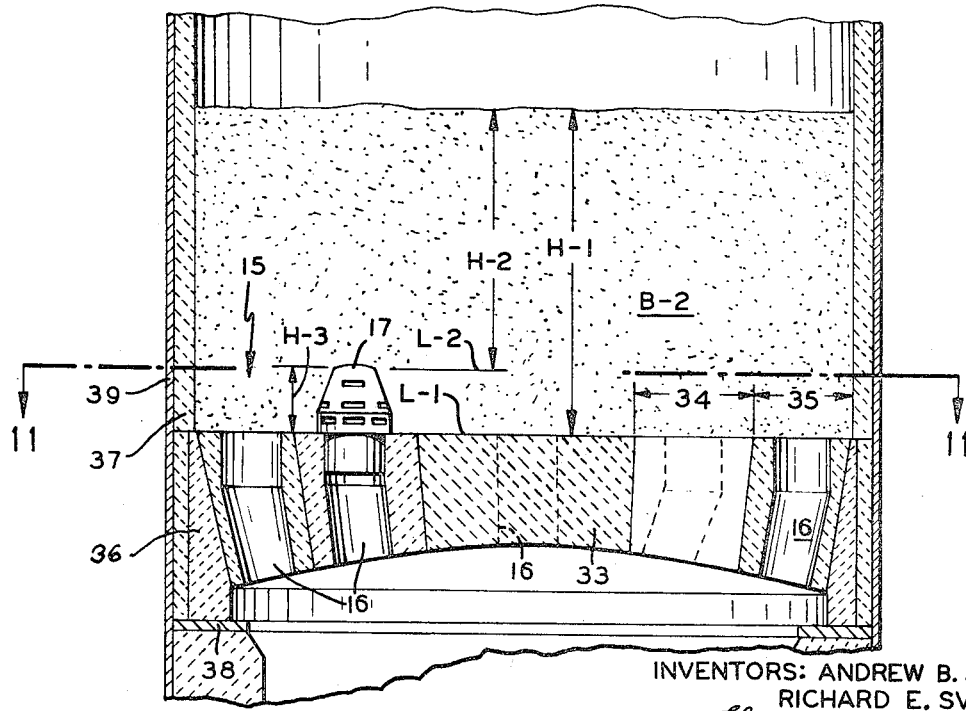

FIG. 10 is a greatly enlarged vertical sectional view of a refractory block type constriction plate, illustrating an arrangement of the nozzles in the blocks and the hydrostatic effect of a fluidized bed upon the operation of the nozzles.

Figure 11:
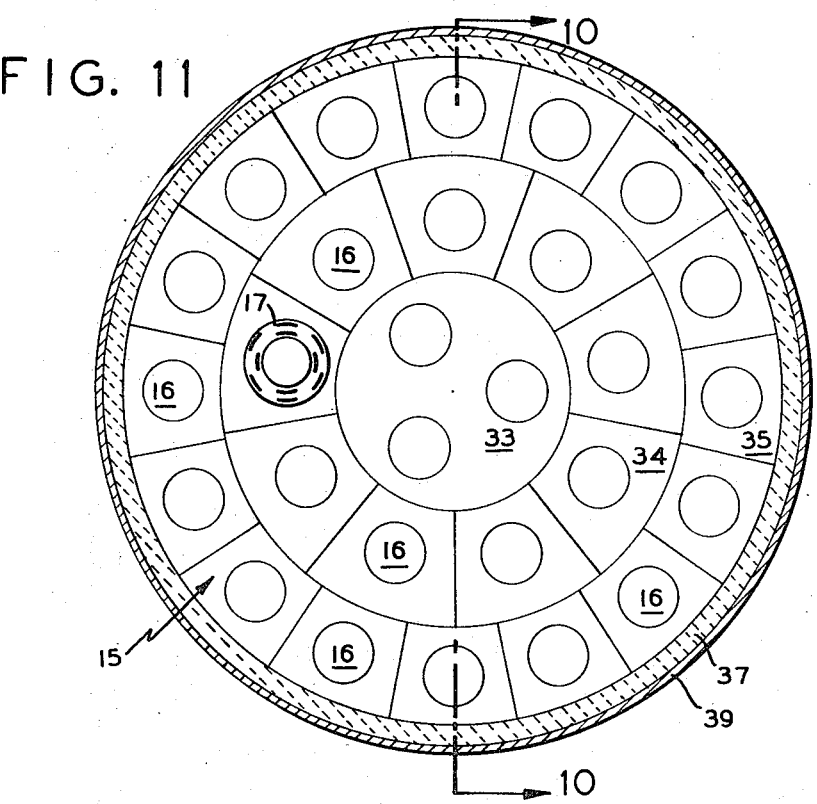

FIG. 11 is a cross-sectional view taken on line 11—11 in FIG. 10, showing a plan view of the block type constriction plate and the arrangement of the nozzles in the blocks.

As this invention may be embodied in several forms without departing from the spirit or essential characteristics thereof, the present embodiments are illustrative and not restrictive. The scope of the invention is defined by the appended claims rather than by the description preceding them, and all embodiments which fall within the meaning and range of equivalency of the claims are therefore intended to be embraced by those claims.

Figure 1:
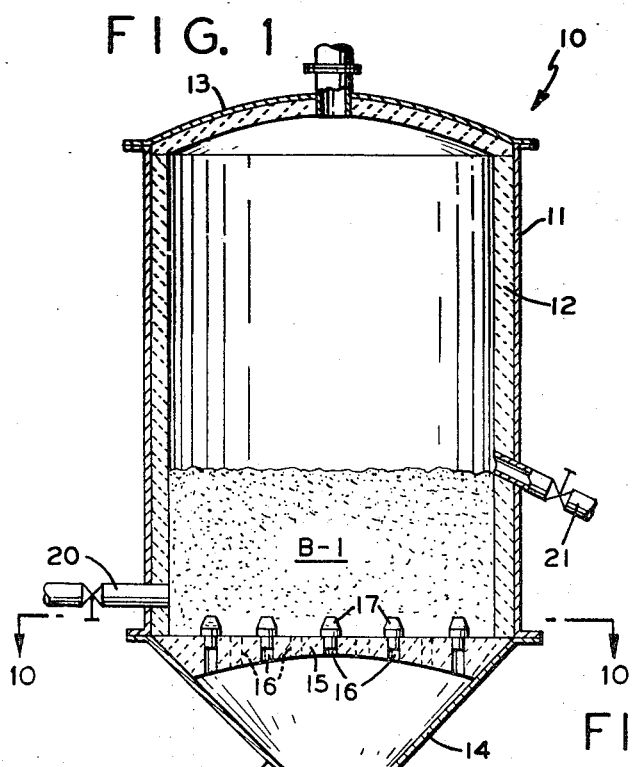
FIG. 1 is a vertical sectional view of a solids fluidizing apparatus employing the improved gas diffusion nozzles of the invention.
Figure 2A:
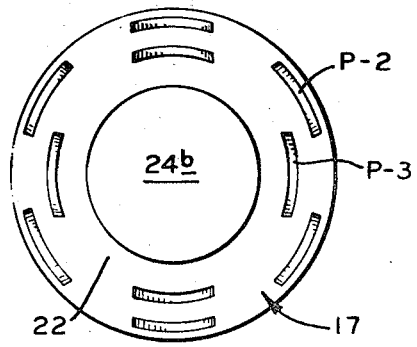
FIG. 2 is a greatly enlarged vertical sectional view of one form of the improved gas diffusion nozzle, featuring graduated gas flow constrictions formed in the wall of the nozzle head.
Figure 2:
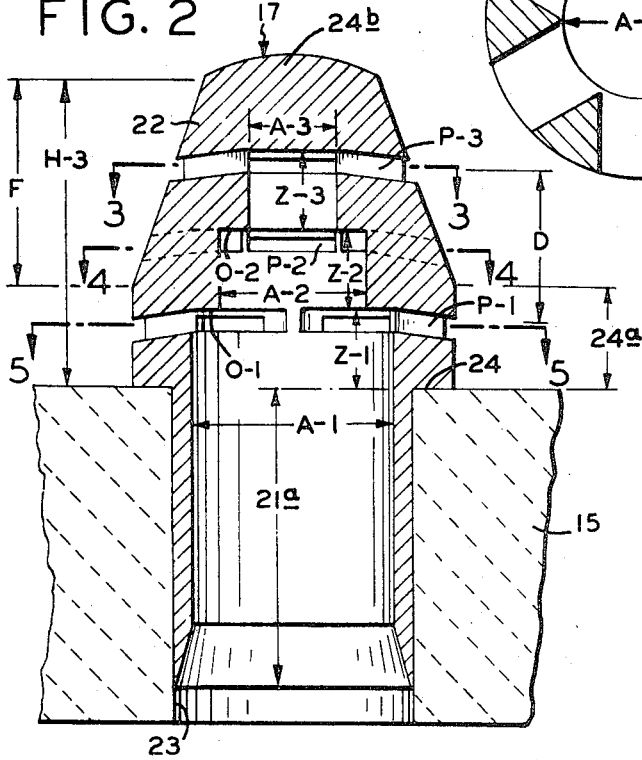

The fluidizing apparatus or unit shown in FIG. 1 as an example to illustrate this invention is in the form of a cylindrical vessel 10, comprising a cylindrical body portion or steel cylinder 11 provided with heat resistant or refractory lining 12, a dished or hollow top cover member 13, and a bottom closure member 14 of inverted conical shape.

The bottom 14 supports a constriction plate 15 which may be in the form of an arched construction, comprising a self-sustaining arrangement of refractory blocks illustrated in more detail in FIGS. 10 and 11. The openings 16 in the constriction plate are each equipped with the improved gas diffusion insert or tuyere 17 of this invention. The bottom member 14 together with the constriction plate constitutes a windbox 18 to which hot fluidizing gases may be supplied as through the valved supply connection 19, for maintaining a bed B–1 of the granular material to be treated in a fluidized state. Supply of the material into the bed is indicated by a valved feed connection 20. A valved discharge connection 21 delivers treated material from the bed.

According to one embodiment of the invention shown in FIGS. 2 to 5, the improved tuyere or gas diffusion nozzle has a neck or shank portion 21a and a head portion 22. The shank is fitted into a hole 23 of the constriction plate, and forms with the head an annular shoulder 24 resting on the horizontal top face of the constriction plate.

The head portion has gas passage openings provided in three vertically superposed zones, namely a lowermost zone Z–1 with passages P–1 in the cylindrical part 24a of the head, an intermediate zone Z–2 with passages P–2, and a topmost zone Z–3 with passage P–3 both located in the frusto-conical part "F" of the head. For the purposes of this invention, the interior contour of the head is such that an annular projection overhangs the passages of each respective zone. Accordingly, zone Z–1 with an open upflow area A–1 which is the same as the shank, has an annular overhang O–1, zone Z–2 having an open upflow area A–2 has an annular overhang O–2, while the upper zone Z–3 having open upflow area A–3 is closed at the top. The internal annular stepwise projections or overhangs herein also termed "choke rings" in the respective zones, provide sequential or graduated upward flow constrictions effective to equalize internal pressure conditions in the nozzle head thereby equalizing the flow of gas through the passages in the respective zones. The graduated flow constrictions provide corrective compensatory effects by reducing the pressure buildup (pressure regain) in the closed end upper zone, while correspondingly increasing the pressure effect at the passages in the subjacent zones. In addition, the arrangement also compensates for an external hydrostatic pressure differential in the fluidized bed, as measured by the vertical distance "D" between the top and bottom zones Z–3 and Z–1.

This dual pressure compensation discourages and suppresses any tendency of particles of the material under treatment to penetrate through the lower gas passages into the interior of the nozzle with consequent erosion of the interior and of the passages.

In the embodiment of FIG. 6, pressure compensating flow-equalizing effects similar to those above set forth, are attainable by means of a stepped flow constricting member 25 forming the removable top closure of a cylindrical nozzle head portion 25a, having radially and slightly downwardly directed gas passages 26. There are in this example four vertically superposed zones S–1, S–2, S–3, and S–4, each having a set of gas passages, all of which may be substantially identical, but of sufficient length to prevent back sifting of the granular material in case of a shutdown. The stepped or graduated formation of the flow constricting member is such as to provide for the passages in the respective zones having progressively constricted annular upflow areas C–1, C–2, and C–3. The flow constricting member is held in place upon the body portion by any suitable means as indicated by a pin 27 or the like. Also, this member 25 may be made vertically adjustable relative to and concentric with the body portion, and it is exchangeable and replaceable, and different forms thereof may be employed or substituted.

In the embodiment of FIG. 7, a separate flow constricting member 28 depending into head portion 29, is shown in the form of an inverted cone instead of the stepped configuration of the member 25 in FIG. 6. Also deviating from FIG. 6 is the conical shape of the head portion, and the provision of tubular inserts 30 providing radially directed gas passages of sufficient length to prevent back sifting after shutdown. The inner end of each tube is cut on a bias at the inner end providing a flow-diverting overhang. These tubes may be press-fitted or otherwise fixed on the head portion in a radially adjusted position. This feature of radial adjustability of the tubes 31 is not dependent upon the conical shape of the head.

The embodiment in FIG. 9 relies upon the shallower conicity of the head portion to provide upward flow constrictions, in order to equalize the gas flow through the multi-level gas passages or radial bores 32.

The enlarged detail views in FIGS. 10 and 11 illustrate a practical working arrangement of a constriction plate composed of refractory blocks to constitute a self-sustained arch construction. In this example, there is a central circular refractory block 33 accommodating three inserted tuyeres, surrounded by concentric rings 34 and 35 composed of wedge-shaped refractory blocks each of which provides the space for a single inserted gas diffusion nozzle. The outer ring 35 is braced against a ring 36 of abutment blocks supported on an annular shelf 38 extending from the steel shell 39 of the fluidization treatment unit, which shell has a refractory lining 37.

A bed B–2 of material undergoing treatment in a state of fluidization is indicated by its depth H–1 relative to the height H–3 of the tuyere heads above the planar top face of the constriction plate. This illustrates the hydrostatic pressure differential between the top and bottom of the tuyere head, that is the differential between pressure at the bottom level L–1 and the higher level L–2. H–2 is the depth of the fluidized bed above the tuyeres.

SUMMARY

This invention provides a high nonsifting capacity gas diffusion nozzle wherein the multizone arrangement of gas passages or ports is pressure compensated. Pressure compensation is by provision of graduated or progressive flow constriction in the nozzle head, effective where an exceptionally high gas volume must be applied at velocities through the nozzle, with high upflow "space rates" in the treatment chamber, to satisfy the requirements for drying the material as well as of size separation in a bed of high density material. It is under such combined conditions that the adverse effect of internal and external pressure differentials become apparent, responsible for the erosion phenomena, but avoidable by this invention.

The compensating effect is such as to suppress a tendency for the gas velocity through the upper level ports to exceed the velocity through the lower level ports, which tendency is due to a combination of an internal dynamic pressure differential (pressure regain) with an external hydrostatic pressure differential.

Thus, a relatively limited number of the improved high capacity nozzle heads is capable of handling, for example, a required gas volume of over 1200 a.c.f./m. for each nozzle head, at shank and port gas velocities approaching 15000 ft./min., and space rates of about 14 ft./min., while limiting the pressure drop across the constriction plate to about 10 inches $H_2O$ to avoid upward displacement of the refractory block or of the nozzles from the blocks due to excess windbox pressure. This pressure drop limitation calls for adequate gas port through-flow area in multizone arrangement which in turn gives rise to the problems solved by this invention.

We claim:
1. In a fluidized bed reactor unit having a reactor housing, a constriction plate having a planar top face dividing the housing into a reaction chamber above and a wind box below the plate, said plate having a plurality of openings uniformly distributed across the area of the plate, and providing upflow passages for a fluidizing gas from said wind box, to maintain a body of particulate material in a fluidized state in said reaction chamber, said reactor unit further having means for feeding said particulate material into said reaction chamber, means for discharging treated material from said reaction chamber, operable for maintaining a required depth of the fluidized bed, and nozzles having a shank portion inserted in a respective opening of the constriction plate, and having a hollow head portion adjacent to said top face of the constriction plate, spaced from the top face of the fluidized bed and constructed and arranged for emitting fluidizing gas radially in all directions, the improvement wherein said hollow head portion of the nozzle is of a height sufficient to accommodate radially directed gas flow passages arranged in a plurality of vertically superposed zones for emitting the fluidizing gas from the respective zones, said gas flow passages being of a length sufficient to prevent backsifting of solids when the bed is defluidized, and wherein the interior of said head portion has flow constricting means providing annular shoulders concentric with, and extending in planes substantially at right angles to the nozzle axis for stepwise decreasing the throughflow area upwardly from one zone to the next and accordingly decreasing the available throughflow area of the gas flow passages in the respective zones, so that the outflow of gas from the bottom zone is at such a rate relative to the outflow of gas from the top zone that the effect of the differential of the hydrostatic pressures from the fluidized bed, between said top zone and said bottom zone, as well as the effect of similar pressure differentials within said head portion due to the effect of upward gas flow velocities, are compensated to the extent of preventing migration of solids through the bottom zone into the interior of said head portion.

2. The improvement according to claim 1, wherein each said zone is defined by an internal cylindrical surface concentric with the nozzle axis, and that the width of each shoulder overhangs the next lower zone of gas flow passages.

3. The improvement according to claim 1, wherein each said zone is defined by an internal cylindrical surface concentric with the nozzle axis, and that the width of each shoulder overhangs the lower zone of gas flow passages, wherein said passages are of horizontally extended flat cross-sectional configuration, and the wall portions separating the gas flow openings in each zone are of substantially triangular configuration with one corner of the triangular shape pointing radially inwardly towards the nozzle axis.

4. The improvement according to claim 3, wherein said flat gas flow passages have substantially uniform width from end to end as well as substantially uniform cross-sectional area from end to end.

5. The improvement according to claim 2, wherein the inner diameter of said shank portion is equal to the diameter of the lowermost zone of gas flow passages.

6. The improvement according to claim 1, wherein said flow constricting means comprise a flow controlling member depending from the top end of said head portion concentric with the nozzle axis, and shaped to provide downwardly facing concentric annular shoulders extending in planes substantially at right angles to the nozzle axis, and vertically spaced from one another by cylindrical surfaces, and in vertical profile constituting a sequence of inverted steps arranged in flow controlling relationship to the gas passages in the respective zones.

7. The improvement according to claim 1, wherein said constriction plate comprises concentric rings of refractory blocks, together constituting a self-sustained arched construction having a planar top face, and wherein one of said nozzles is mounted in each said block.

8. In a fluidized bed reactor unit having a reactor housing, a constiction plate having a planar top face dividing the housing into a reaction chamber above and a windbox chamber below the plate, said plate having a plurality of openings uniformly distributed across the area of the plate, and providing upflow passages for a fluidizing gas from said wind box chamber, to maintain a body of particulate material in a fluidized state in said reaction chamber, said reactor unit further having means for feeding said particulate material into said reaction chamber, means for discharging treated material from said reaction chamber, operable for maintaining a required depth of the fluidized bed, and nozzles having a shank portion inserted in a respective opening of the constriction plate, and having a hollow head portion adjacent to said top face of the constriction plate, spaced from the top face of the fluidized bed, and constructed and arranged for emitting fluidizing gas radially in all directions, the improvement wherein said hollow head portion of the nozzle is of a height sufficient to accommodate radially directed gas flow passages arranged in a plurality of vertically superposed zones for emitting the fluidizing gas from the respective zones, said gas flow passages being of a length sufficient to prevent backsifting of solids when the bed is defluidized, and wherein the interior of said head portion is of a conical shape providing upwardly decreasing horizontal flow cross-sections whereby the decrease from the lowermost zone to the uppermost zone is such as to divert gas flow through the passages in the respective zones, while insuring the outflow of gas from the bottom zone at such a rate relative to the outflow of gas from the top zone, that the effect of the differential of the hydrostatic pressures from the fluidized bed at the top zone and the bottom zone, as well as the effect of similar pressure differentials within said head portion due to the effect of upward gas flow velocities, are compensated to the extent of preventing migration of solids through the bottom into the interior of said head portion.

9. The improvement according to claim 8, wherein said head portion comprises an intermediate transitional portion of inverted conical shape, connecting it with said shank portion.

10. The improvement according to claim 9, wherein flow constricting means further comprise a flow controlling member of inverted conical shape depending from the top of said head portion.

11. The improvement according to claim 8, wherein said constriction plate comprises concentric rings of refractory blocks, together constituting a self-sustaining arched construction having a planar top face, and wherein one of said nozzles is mounted in each said block.

References Cited

UNITED STATES PATENTS

| | | | |
|---|---|---|---|
| 45,948 | 1/1865 | Marshall | 126—163AX |
| 564,864 | 7/1896 | Bonnet | 126—163A |
| 3,089,251 | 5/1963 | Helbig et al. | 34—57T |
| 3,266,788 | 8/1966 | Jukkola | 263—21A |
| 3,298,792 | 1/1967 | Di Drusco | 34—57A |
| 2,321,432 | 6/1943 | Somes | 239—553.5X |
| 2,359,690 | 10/1944 | Tarbox | 239—553.5 |
| 2,841,476 | 7/1958 | Dalton | 34—57T.X |
| 3,040,439 | 6/1962 | Frost | 34—57T |

FOREIGN PATENTS

| | | | |
|---|---|---|---|
| 534,836 | 1/1922 | France | 110—75C |
| 764,685 | 3/1934 | France | 110—75C |

CARLTON R. CROYLE, Primary Examiner

R. A. DUA, Assistant Examiner